United States Patent [19]
Owen

[11] Patent Number: 5,585,583
[45] Date of Patent: Dec. 17, 1996

[54] INTERACTIVE MUSICAL INSTRUMENT INSTRUCTION SYSTEM

[75] Inventor: Randall L. Owen, Valencia, Calif.

[73] Assignee: Maestromedia, Inc., Los Angeles, Calif.

[21] Appl. No.: 136,651

[22] Filed: Oct. 14, 1993

[51] Int. Cl.[6] .................................................. G09B 15/00
[52] U.S. Cl. ......................... 84/470 R; 84/454; 84/477 R
[58] Field of Search .............................. 84/600–602, 604, 84/605, 645, 634, 470 R, 464 R, 477 R

[56] References Cited

U.S. PATENT DOCUMENTS

| | | | |
|---|---|---|---|
| 5,225,618 | 7/1993 | Wadhams | 84/602 |
| 5,270,475 | 12/1993 | Weiss et al. | 84/603 |
| 5,294,745 | 3/1994 | Yamauchi et al. | 84/601 |

OTHER PUBLICATIONS

Sonic Images, "A Beginner's Guide", 1992, 2 pages.
Lyrrus, "Play With It", 1993, 4 pages.

Primary Examiner—Patrick J. Stanzione
Attorney, Agent, or Firm—Lyon & Lyon

[57] ABSTRACT

A musical instrument instruction system utilizes a CD-ROM electronic storage medium to store audio and video musical instrument instructional materials. Instructional materials are accessed utilizing a computer which provides an interactive system in which animation, voice, music, video and imagery are integrated in essentially real time and under complete control of the music student. The system permits the student to access the instructional materials in a variety of ways, and control the parameters governing the presentation of the instructional materials, including control of the tempo of the music and whether or not displays of the manner of playing the musical instrument will be shown with a displayed notation or tablature relating to the selected musical piece. A mixer is provided for combining musical output of the practice instrument with musical output generated by the computer corresponding to the selected musical piece.

32 Claims, 9 Drawing Sheets

INTERACTIVE MUSICAL INSTRUMENT INSTRUCTION SYSTEM

BACKGROUND OF THE INVENTION

This invention relates generally to automated multimedia systems, and, more specifically, to a computer-based system for learning to play or practice a musical instrument.

Learning to play a musical instrument can be an enjoyable and rewarding experience. In fact, almost everyone at one time or another has either attempted to play or has considered learning to play a musical instrument. However, to develop proficiency in playing a musical instrument requires dedication, many hours of practice, and the application of proper playing techniques and methods.

Conventional learning tools and sources of instructional information for learning to play a musical instrument include music teachers, music books, audio tapes or compact disks (CDs), and video tapes. While each of these offers certain advantages, each is also limited in the quality of instruction or the manner in which the information is presented.

For example, a music teacher provides personally-tailored instruction, however the cost of the instruction is relatively expensive and each session is necessarily limited both in time and depth. Additionally, the student may be limited to learning the playing style and habits (both good and bad) of the particular teacher, which may limit the student's creativity and spontaneity. To develop proficiency the student must devote many hours to practicing assigned material alone and unsupervised, and if questions arise during these practice sessions they must usually be saved until the next lesson. In addition, the practice material assigned by the instructor is static and is therefore unable to accommodate and adjust to the student's individual progress or proficiency.

Music books provide a relatively low-cost alternative or adjunct to a music teacher. Most of the newer music books include accurate transcriptions of the music and many include notes and playing tips for helping the student learn the material. However, the material presented by music books is necessarily static and if the student has difficulty reading and interpreting music, particularly the tempo and rhythm, then music books provide a limited instructional capability. Additionally, music books are not interactive and provide no feedback to the student, making it difficult to develop a "feeling" for the music which is necessary to progress beyond purely technical or mechanical playing.

Audio tapes or compact disks combine recorded songs and musical passages with instructional commentary and playing tips. Some audio tapes and compact disks include songs and musical passages recorded both at normal speed and reduced speed to make learning easier for the student. With both audio tapes and compact disks, however, looping or repeating a particular song or passage may be cumbersome and difficult. In addition, if the songs and musical passages are not recorded at reduced speed, then reducing the speed using conventional tape or compact disk players is generally not possible. Moreover, audio tapes and compact disks do not provide any visual instruction or feedback, which can make it difficult for the student to develop a feeling for the music.

Video tapes provide sound and full-motion video so that the student can see the instructor and simultaneously hear the song or passage being played. The nature of the video tape medium, however, allows little or no interactive control of the delivery of the instructional material. The lesson is presented at one speed and looping or repeating in order to practice a particular song or musical passage is difficult. Additionally, the imaging resolution of standard video tapes is inadequate to allow the musical notation or tablature to be displayed in an acceptably readable format on the television screen. Moreover, video tapes are also relatively expensive, ranging in price from $50.00 to over $100.00.

Recently, computer-based music instruction systems have been proposed to address some of the limitations of the conventional tools and sources of information. For example, a device called the "G-VOX" (available from Lyrrus, Inc., 35 North 3rd Street, Philadelphia, Pa. 19106) includes a detachable pickup and signal processor for connecting a guitar to a personal computer. The G-VOX signal processor contains a music-detection algorithm for detecting notes and chords as they are played and converting them to digital signals which can be processed by the computer. The G-VOX also includes a software program which can familiarize a beginner with the basic notes and chords on a guitar, and software libraries containing additional information regarding more advanced techniques and styles.

However, the G-VOX provides no audio feedback of the guitar being played, making it difficult to develop the musical feeling necessary to progress beyond purely technical or mechanical playing. Additionally, the sound provided by the computer is limited to examples of short note sequences and chord progressions. There is no video feedback of an instructor, no voice commentary or playing tips and, since there is no audio feedback of the guitar being played, there is no live tone to be matched to the computer-generated tone to provide ear training. Finally, the overall operation and sensitivity of the G-VOX requires that the detachable pickup be precisely positioned over the guitar strings. Thus, although the G-VOX does address some of the limitations of convention tools and information sources, it does not provide an integrated approach to learning both technical playing skills and musical feeling.

In an attempt to address some of the limitations of conventional instructional materials, students have often practiced songs and passages by slowing down 33⅓ RPM vinyl records to 16½ RPM. In particular, the student plays along with the slowed song or musical passage, repeating the process until the particular song or passage is learned. This approach requires the student to transpose the music, since slowing the rotational speed by one half also lowers the pitch of each note by approximately one octave. In addition, only half speed is usually available and repeating a song or passage is very cumbersome and the overall process is time consuming. Moreover, this approach is generally not possible with cassette tapes, video tapes or conventional compact disks.

The basic concept of listening and immediately playing is known to be a powerful technique for learning both neuromotor skills and feeling required to develop playing proficiency. Recent studies regarding the learning of complex neuromotor skills have been conducted using interactive video games. Many of these studies indicate that dramatic increases in playing skill can occur if a player plays a game immediately after having observed an expert play the game. Specifically, stress and the negative effects of stress on the player can play significant roles in inhibiting the player from achieving additional levels of successful play. The learning feedback and associated stress reduction which can occur by watching the expert play can lead to rapid learning of new eye-hand combinations, new playing strategies, and new ways of operating the manual playing device that is used to interact with the game.

The results of the learning studies using interactive video games are directly applicable to the learning of a musical instrument. In particular, the quality and efficiency of learning can be dramatically improved by having the student first observe an expert play a song or passage, and immediately afterwards having the student then play the same song or passage. This is, in fact, the teaching approach utilized by many music teachers to help the student to more efficiently develop both technical playing skills and an overall feeling for the tempo, rhythm and structure of the music.

Accordingly, there is a need for an interactive method and system for learning and practicing a musical instrument which provides both audio and visual feedback, and in which the delivery of the instructional material can be controlled by the student. Further, there is a need for such an interactive method and system which provides an integrated learning approach in which the student can observe an expert play a song or passage and then immediately play the same song or passage. The present invention fulfills these needs and provides further related advantages.

SUMMARY OF THE INVENTION

The present invention is directed to a musical instrument instruction system in which instructional material is presented in a way that is both educational and entertaining, thus encouraging the student to practice and to experiment with new playing techniques and styles. The musical instrument instruction system includes the steps of providing both audio and video instructional materials on an electronic storage medium, and utilizing a computer to select instructional materials to be presented from those stored on the electronic storage medium. Delivery parameters are selected by the student to provide a desired playback of the selected instructional material, and then a selected musical piece is played back in accordance with the selected delivery parameters.

In a preferred form of the invention, both audio and video instructional materials are provided on a CD-ROM electronic storage medium. The computer is utilized to access the data on the CD-ROM and, initially, the student selects either a song to be played or a drill to be practiced.

In selecting the delivery parameters to customize the playback of the selected instructional material, the student selects whether or not to display an expert musician playing a selected musical piece in a video display concurrently with audio output of the musical piece by the computer. The student is further provided the opportunity to control the tempo of the musical output generated by the computer without affecting the pitch thereof. To accomplish this, the computer utilizes a sample and hold circuit which receives input from a waveform frame buffer and a hold time buffer, to control the tempo. This efficiently provides the desired musical output while minimizing the memory storage requirements to the computer itself.

When playing back the selected musical piece in accordance with the selected delivery parameters, the notation or tablature of the musical piece is displayed. Moreover, the particular note or chord of the notation or tablature being played is highlighted for the relative duration of the note or chord. The student is also provided the opportunity to select whether or not a video display of the manner of playing the musical instrument will be shown with the displayed notation or tablature.

The musical instrument instruction system combines musical output of a practice instrument with musical output generated by the computer corresponding to the selected instructional material. In this regard, the process for learning to play a musical instrument includes the steps of mixing musical output of the practice instrument with musical output of the computer. Background music is provided through the computer, and the student is able to control the mix of background music relative to foreground music, as well as control the mixture of musical output of the practice instrument relative to musical output of the computer.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
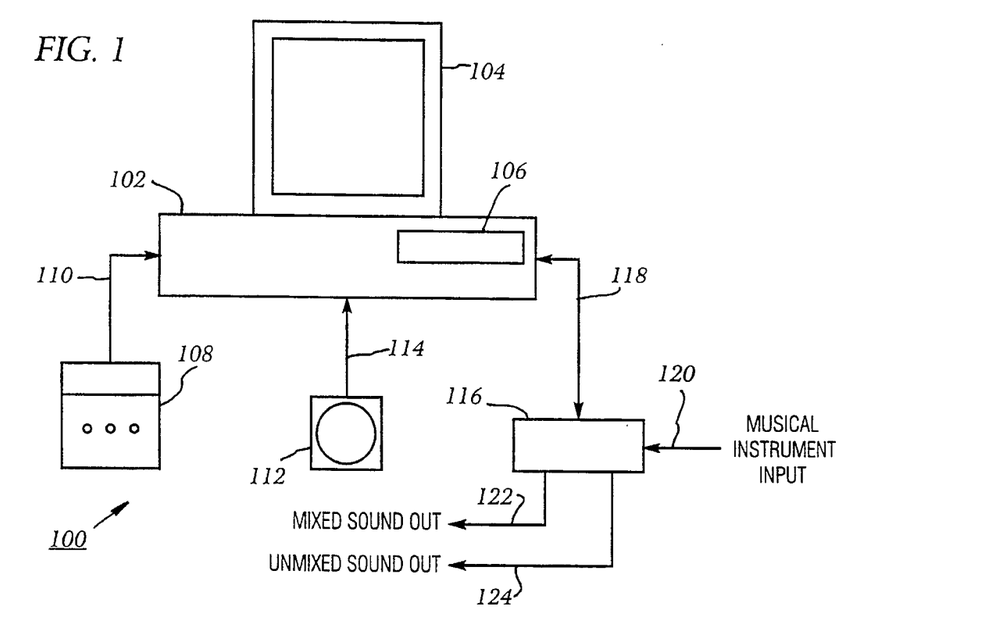
FIG. 1 illustrates the principal components and interconnections of an interactive music instruction system constructed in accordance with the present invention.
Figure 10:
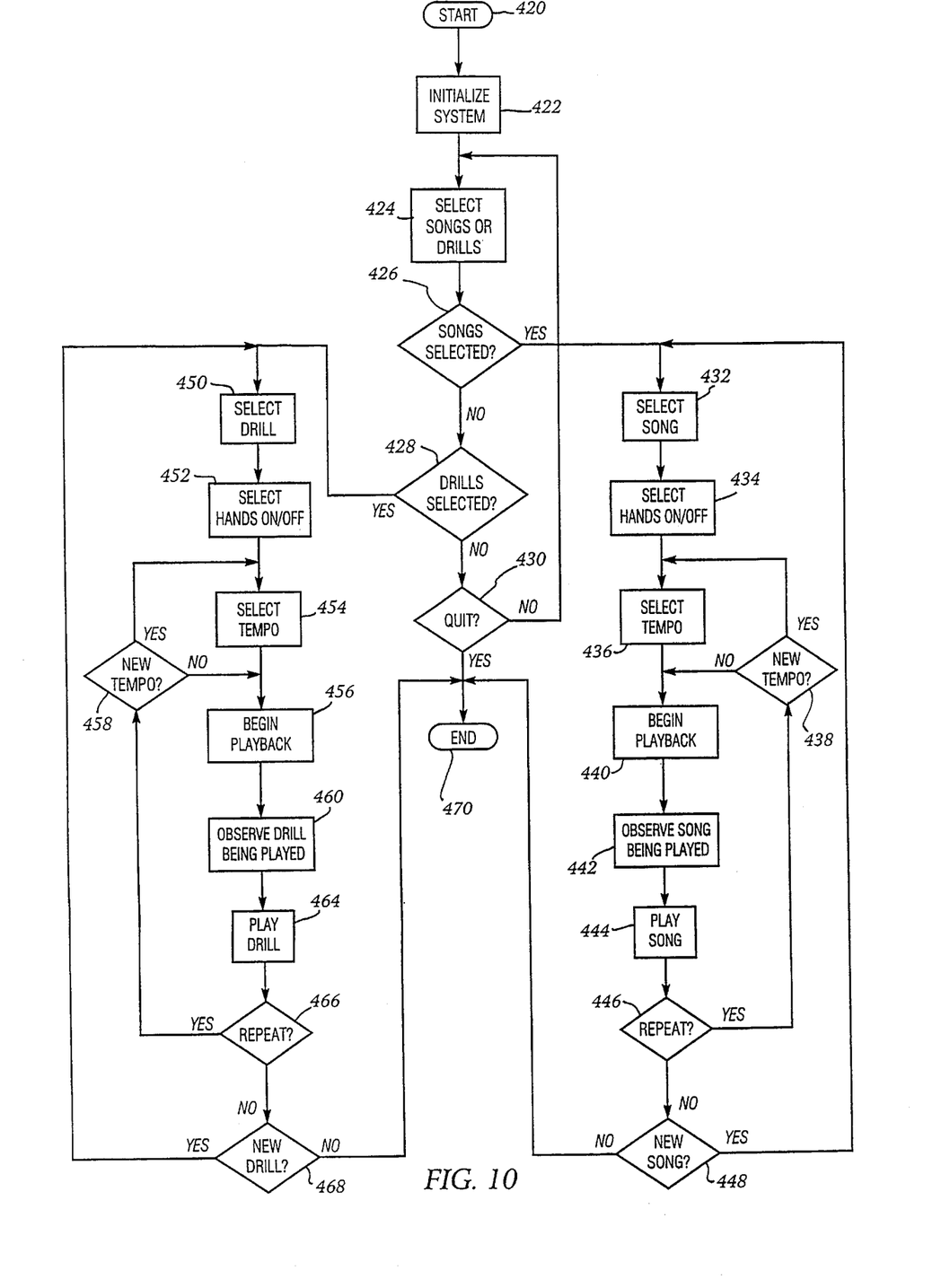
FIG. 10 is a flowchart illustrating the principal steps of the instructional method of the present invention.

As shown in the drawings for purposes of illustration, the present invention is concerned with a a music instruction system, generally designated in FIGS. 1 and 10 by the reference number 100. As shown best in FIG. 1, the music instruction system 100 comprises a computer 102 which has a display device 104 and a conventional disc drive 106. The computer 102 is preferably a conventional personal computer such as an IBM PC or other compatible system, which contains a central processing unit (CPU) and sufficient system memory to control the system components and allow the instructional material to be presented in essentially real time. The display device 104 includes a color monitor and display driver for displaying sequences of full color images in real time. The display device 104 includes the capability of displaying multiple full motion images simultaneously, and can display the images with sufficient resolution so as to make reading music and/or text possible. The disk drive 106 includes a conventional hard disk drive having at least 300 megabytes of storage capacity. The disk drive 106 provides storage for the operating software and utilities used by the system 100. The disk drive 106 also provides intermediate storage for the digital programs and data read from a CD-ROM.

A control device 108 is connected to the computer 102 via a signal path 110. The control device 108 may comprise a conventional handle-operated control transducer ("mouse"), a joystick, or other suitable means for providing simplified control of the system 100 so that a student can concentrate on learning to play an instrument rather than operating the computer system. The control device 108 includes an interface program which can position a software cursor on the display device 104 for selecting from among plural operating modes and options. For example, the control device 108 may be used to start and stop the music instruction, to select specific musical material to be presented, and to select or modify the tempo, rhythm, tone, and other attributes of the music.

A CD-ROM drive 112 is also connected to the computer 102 via a signal path 114, and includes a conventional CD-ROM drive for reading data which is stored on a CD-ROM. The CD-ROM drive 112 may be contained within the computer 102 or may be a stand-alone unit. In the preferred embodiment, the CD-ROM drive 112 has a data transfer rate of at least 300 kilobytes per second, and includes sufficient control capability to allow for reading the stored data on a frame-by-frame or sector-by-sector basis.

A single CD-ROM is capable of storing over six hundred megabytes of data, which is equivalent to about 100 million words of text, or as much data as can be stored on about 500 conventional floppy disks. Thus, a CD-ROM containing instructional material in the form of audio and video data can provide storage and fast retrieval of hundreds of megabytes of data, thus allowing an interactive video and audio presentation of the instructional material. Each CD-ROM utilized in connection with the music instruction system 100, contains all of the operating and control software needed to generate the audio and video portions of the instructional material.

Figure 2:
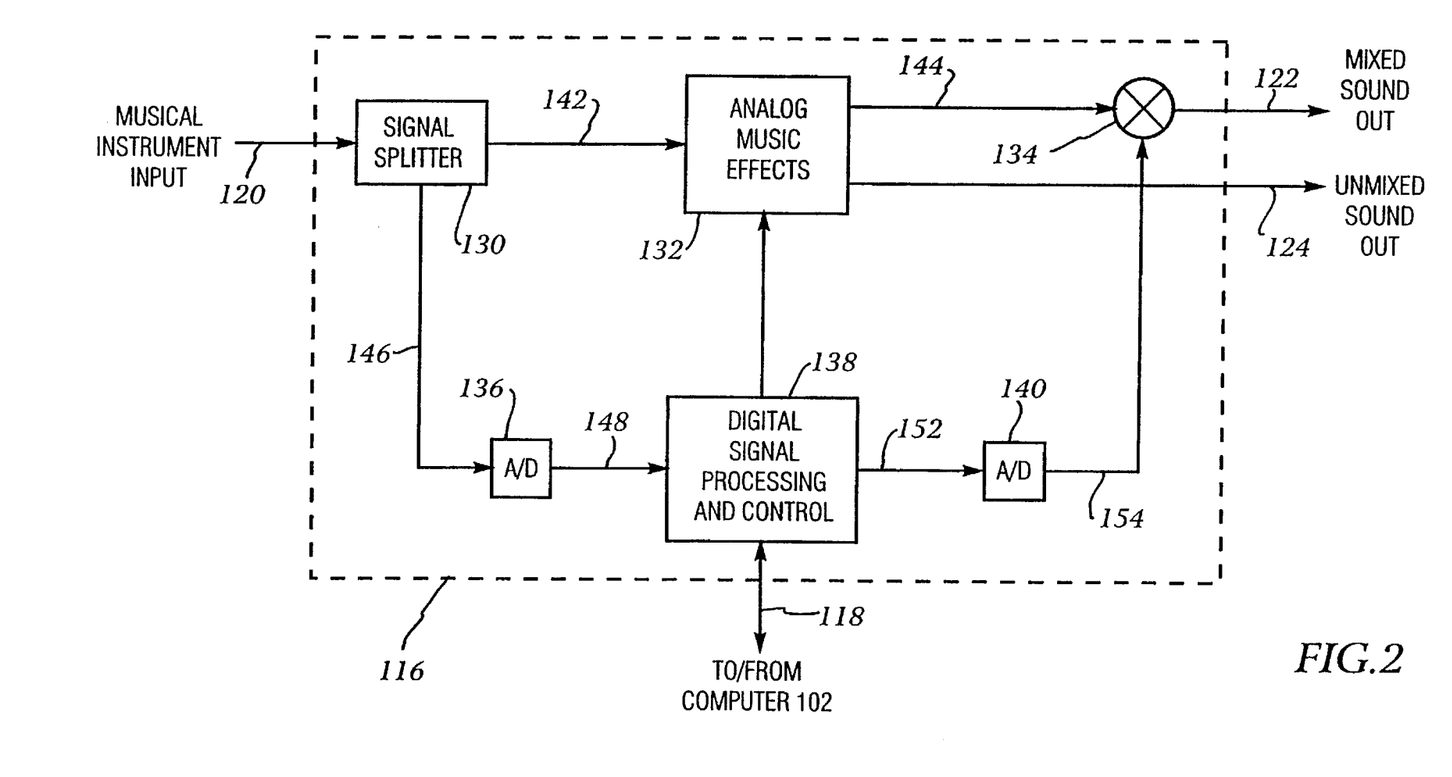
FIG. 2 is a functional block diagram of a sound device shown in FIG. 1.

A sound device 116 is connected via a signal path 118 to the computer 102, to provide sound output for the system 100 (FIGS. 1 and 2). The sound device 116 includes an input 120 for a guitar, microphone or other line-level signals, and outputs 122 and 124 for headphones, speakers, or to drive an external audio amplifier. The inputs and outputs for the sound device 116 may be either monaural or stereo. Thus, the sound device 116 can effectively function as a practice amplifier during individual practice, or to drive an external amplifier for use during group practice. When functioning as a practice amplifier, external effects such as equalization, delay, distortion, flanging and stereo chorus may be added to the musical tones generated by the instrument. This allows the student to match the tone of the instrument with the output of the system in order to provide ear training.

As shown best in FIG. 2, the guitar or microphone input 120 is fed to a signal splitter 130 which splits the inputted analog signal into two distinct paths. A first path routes the analog musical instrument signal to a music effects circuit 132 of the sound device 116 via a signal path 142. The music effects circuit 132 processes the analog musical instrument signal by adding effects such as distortion, delay, and/or stereo chorus to the signal under control of a digital control circuit 138. The processed signal is then routed to a mixer 134 via a signal path 144.

The second path signal is routed via a signal path 146 into an analog-to-digital converter 136. digital output is then routed by a signal path 148 into the digital control circuit 138. The digital control circuit 138 pre-processes the input digital signal for further processing by the computer 102. More particularly, digital control circuit 138 converts the digital pulse-code modulated (PCM) output of the analog-to-digital converter 136 into digital signals having a specific format which can be communicated to and from the computer 102 for processing. The digital control circuit 138 receives digital signals from the computer 102 and, after some preliminary processing, such as filtering, sends the processed digital signals through a signal path 152 to a digital-to-analog converter 140, where they are converted to corresponding analog musical tone signals. The analog musical tone signals are forwarded by the signal path 154 to the mixer 134 where they are mixed with the processed signal from the music effects circuit 132. The mixed signal is then forwarded to further amplification or to a sound producing device such as a loudspeaker or headphones (not shown). The mixed sound output 122 ties into the mixer 134, whereas the unmixed sound output 124 ties directly into the music effects circuit 132 of the sound device 116.

The music instruction system 100 of the present invention provides an interactive computer-based instructional system in which the instructional material, in the form of integrated animation, voice, music and video, is presented in essentially real time and under complete control of the student. As will be seen hereafter, the tempo and difficulty of the instructional material can be controlled and adjusted by the student to match his or her individual proficiency. In addition, the present invention includes an instructional method in which the student first observes an expert musician play a song or musical passage, and then plays the same song or passage. The student is thus actively engaged in the learning process and in fact helps in selecting and controlling the events which form his or her particular learning experience. Using the present invention, the student can efficiently develop both technical playing skills and an overall feeling for the tempo, rhythm and structure of the music.

As discussed above, the basic music instruction system 100 comprises four primary components: the personal computer 102 having the display device 104 and a CD-ROM drive 112, the control device 108 for providing control of the system 100, the sound device 116, which may include a sound card (within the computer 102), for combining the musical output of the musical instrument with musical output of the system 100, and one or more CD-ROMS containing the instructional material in a software format. These components support an instructional method in which songs and musical passages are played by the musician or composer, followed by immediate playing of the same material by the student. A synchronous, full-motion video image of the musician or composer who is providing the lesson may be displayed, and the student may either observe the musician or composer and then play the same song or passage, or simply play along with the musician or composer. The student is thus actively engaged in the learning process and in fact helps in selecting and controlling the events which form his or her particular learning experience.

For example, in an interactive system for learning to play a guitar the musical notation 512 and tablature 514 (see FIG. 13) for a given song or passage may automatically display while the corresponding music is being played. As each note or chord is played, that note or chord may be highlighted for the relative duration of the note or chord (e.g., whole notes are highlighted four times as long as quarter notes). Additionally, the system 100 permits the overall tempo of the song to be interactively adjusted by the student according to his or her individual playing proficiency. Additionally, the music being played by the student may also be displayed in standard musical notation and/or tablature for visual comparison with the recorded music. The music being played may also be stored for later review and analysis.

Continuing with the example, the songs may be selected either to present the music and style of a particular musician, or to present the general playing techniques of a broader musical category (e.g., rock, blues, jazz). The musical passages may include standard scales, finger exercises and chord progressions, or more advanced material such as wide-interval fingering, two-handed tapping and harmonics. In either case, the overall tempo of the song or passage may be manually adjusted by the student or automatically adjusted by the system according to the student's individual playing proficiency. The musician or composer of the music can also be displayed at any time during the lesson, either to demonstrate the playing of a particular song or passage, to provide playing tips and comments, or to simply play along with the student.

The music instruction system 100 of the present invention may also be configured to provide a video game in which the student plays through the different levels of the game by playing his or her instrument. For example, the first level might have the user (and perhaps a "virtual" band) playing in a garage and would require the student to play relatively simple chord progressions or melodies. The second level might have the student playing complete songs at backyard parties or high school dances. The next level might be playing "top 40" material at clubs and so on, until obtaining a record contract at which time the user begins opening for top groups. The upper levels might have the user as the opening act on a stadium tour, culminating with a top group opening for him or her.

Figure 3A:
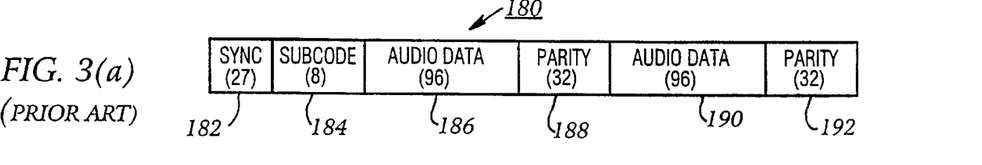
FIG. 3(a) illustrates a prior art data format used for storing music data on an audio compact disk.
Figure 3B:
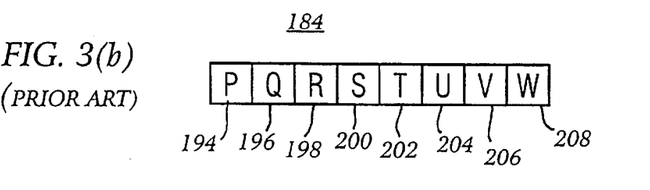
FIG. 3(b) illustrates the bit format of the subcode 184 used with the data format of FIG. 3(a)
Figure 3C:
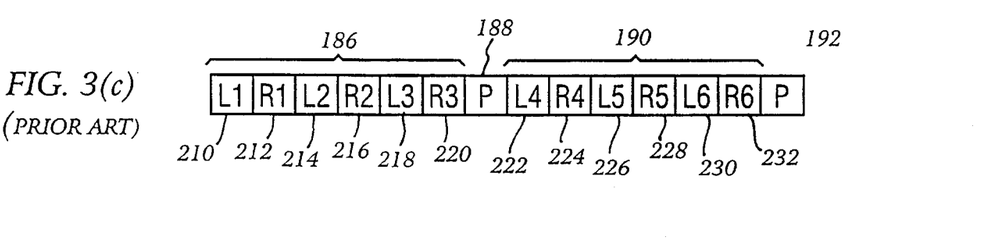
FIG. 3(c) illustrates the data format used for storing the audio data of FIG. 3(a)

In order to better understand the music instruction system 100, some discussion relating to prior art electronic data storage and retrieval is warranted. With reference to FIGS. 3(a)–(c), a prior art data format used to format musical data for storing in a conventional audio compact disk (CD) is shown. The musical data which comprises each song is stored as a sequence of CD frames of which CD frame 180 is an example. CD frame 180 includes a 27-bit synchronization word 182, an 8-bit subcode 184, 192 data bits 186 and 190 (i.e., two 96-bit data segments), and 64 parity bits 188 and 192. Prior to storage, the CD frame 180 is processed by modulation and the addition of merging bits to form a modulated bit stream (not shown). Synchronization word 182 is added prior to each CD frame to identify each frame and to make the bit stream self-clocking.

As shown in FIG. 3(b), the eight bits 194 to 208 of the subcode 184 are respectively designated P, Q, R, S, T, U, V, and W, and are conventionally referred to as the "PQ code". During playback, subcode symbols from ninety-eight consecutive frames are collected to form a subcode block of eight 98-bit words. Only the 98-bit words derived from the bits 194 and 196 (i.e., bits P and Q) are used in conventional audio CDs, and these two words encode information such as the number of selections on the CD, the beginning and ending points and timings of the selections, and any index points within the selections. The other six bits 198–208 are available for encoding up to twenty-four megabytes of additional information on an audio CD.

As shown in FIG. 3(c), the data segments 186 and 190 contain six 32-bit PCM audio sampling periods which are grouped with the left stereo channel proceeding the right stereo channel. Each 32-bit sampling period consists of two 16-bit words which are each divided to yield four 8-bit audio symbols. For example, in FIG. 3(c) the data segment 186 contains 16-bit words 210–220, while data segment 190 contains 16-bit words 222–232. The audio program which is stored in the data segments 186 and 190 may consist of either stereo or dual monaural left and right channels. Although some recordings have used independent left and right monaural channels, the conventional audio CD standard does not support this configuration.

During playback, the 32-bit PCM audio sampling periods which encode the left and right channels of the selected song are read by the computer system 102 and processed by the sound device 116 to regenerate the encoded musical tones. More particularly, referring again to FIG. 2, the PCM sampling data is decoded by the digital control circuit 138 and converted to a corresponding analog signal by digital-to-analog converter 140. The analog signal is then mixed with the processed signal from music effects circuit 132 by the mixer 134, which the resulting signal used to generate the left and right channels of the musical tones.

Figure 4:
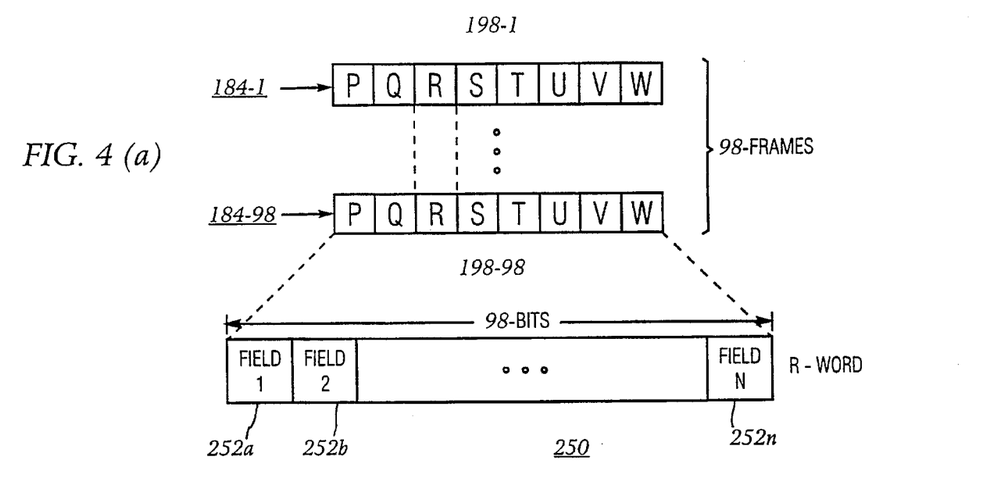
FIG. 4(a) illustrates the formation of a subcode block using 98 frames of subcode.
FIG. 4(b) illustrates a data format used by the present invention for storing foreground and background audio data.
FIG. 4(c) illustrates the formation of a CD-ROM data block using 98 frames of audio data.
Figure 4B:
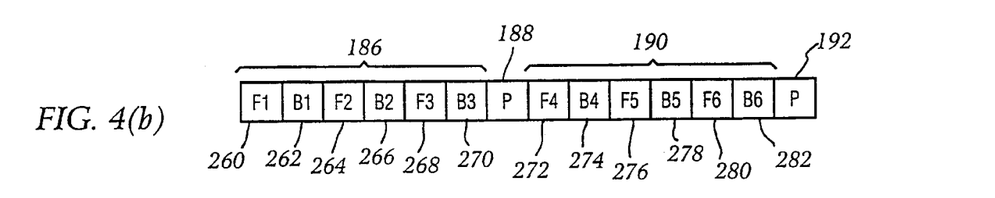
Figure 4C:
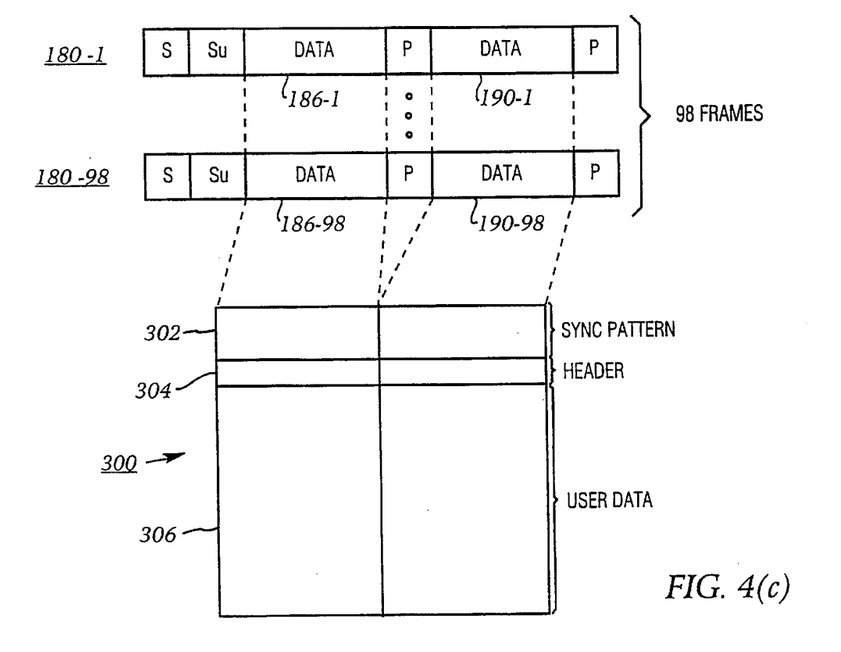

FIGS. 4(a)–(c) illustrate the data format used in the present invention to store instructional audio and video data on a conventional CD-ROM. Referring to FIG. 4(a), a 98-bit subcode word 250 derived from the R bits 198-1 to 198-98 of ninety-eight consecutive subcode symbols 184-1 to 184-98 in accordance with the present invention is shown. The subcode word 250 includes N data fields 252(a)–254(n) which may encode control and/or informational data relating to the audio data stored on the CD. An example of control data might be data which individually adjusts the volume or tone for each song. Similarly, an example of informational data might be the name of the musician or group who preforming each song.

FIG. 4(b) shows the structure of data segments 186 and 190 used with the present invention. Data segments 186 and 190 contain six 32-bit PCM audio sampling periods which are grouped with the foreground channel proceeding the background channel. Each 32-bit sampling period consists of two 16-bit words which are each divided to yield four 8-bit audio symbols. For example, data segment 186 contains 16-bit words 260–270, while data segment 190 contains 16-bit words 272–282. The audio program which is stored in the data segments 186 and 190 may consist of either stereo or dual monaural foreground and background channels.

The 32-bit PCM audio sampling periods which encode the foreground and background channels of the selected song are read by the computer system 102 and processed by the sound device 116 to generate the encoded musical tones. More particularly, referring again to FIG. 2, the PCM sampling data is decoded by the digital signal processor 138 and converted to a corresponding analog signal by the digital-to-analog converter 140. The analog signal is then mixed with the processed signal from music effects circuit 132 by the mixer 134, with the resulting signal used to generate the foreground and background channels of the stereo musical tones.

For example, when a particular song is selected for play by the student, the computer system 102 searches the words of the subcode block to locate the data corresponding to the selected song. The computer system 102 then reads data stored in the subcode blocks to determine the corresponding information. The foreground and background data fields are then read by the computer system 102 to generate the musical tones.

FIG. 4(c) illustrates a conventional CD data sector 300 constructed from ninety-eight consecutive audio CD frames 180-1 to 180-98. The data sector 300 provides 2352 bytes of data storage and forms the basic CD-ROM data unit. The first twelve bytes from the 2352-byte block are used as a synchronization word 302. The next four bytes form a header field 304 used for time and address flags. Specifically, the header 304 contains three address bytes and a mode byte (not shown). The address bytes store location as time: one address byte holds minutes, the second address byte holds seconds and the third address byte holds the block number within the second (75 blocks per second).

For example, an address of 59-30-45 denotes the 45th block of the 20th second of the 59th minute of the disk. Although this repeats information found in the Q subcode channel, it speeds and provides greater accuracy for searching.

Continuing with FIG. 4(c), the mode byte (not shown) indicates the nature of the user data 306; for example, computer data as distinguished from audiovisual data. Three modes are commonly used to identify CD-ROM data. Mode 0 is used for null data, while mode 1 specifies that 2048 bytes of each block are devoted to user data. The mode 2 format provides for 2336 bytes of user data. The difference between mode 1 and mode 2 is that mode 1 uses 288 bytes to provide an additional layer of error correction and detection. This is in addition to the basic error correction used on all compact disks, ensuring a level of data integrity essential for data that does not degrade gracefully, such as text and database binary code. Mode 2 trades this benefit of data security for maximum data rate by making the additional 288 bytes per sector available for user data. However, the basic error correction is sufficient for gracefully degrading data such as audio and video.

Figure 5:
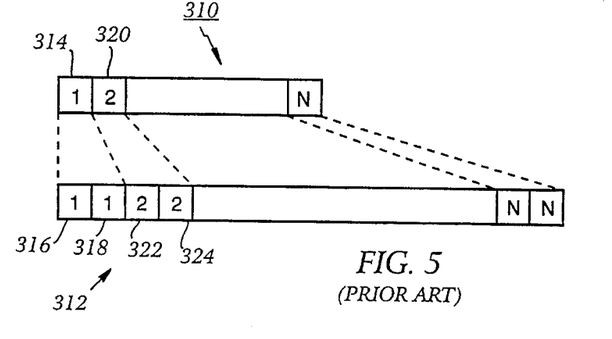
FIG. 5 illustrates a prior art method of reducing the playback speed of audio data without changing the pitch.

The adjustment of playback speed will now be discussed with reference to FIGS. 5-8. First, with reference to FIGS. 5 and 6, a prior art method of adjusting the playback speed of a CD-ROM will be discussed. FIG. 5 shows representative digital PCM channel data 310 which includes a plurality of data elements 314. For example, each of the data elements 314 may represent a PCM sample of a time-domain analog signal. In order to reduce the playback speed by a factor of two, each element 314 of digital PCM data 310 is replicated once, so that digital PCM data 312 is created. Note that each data element 314 has been replicated to produce two identical data elements 316 and 318. Note also that the amount of memory required to store the digital PCM data 312 is twice that required to store digital PCM data 310.

Figure 6:
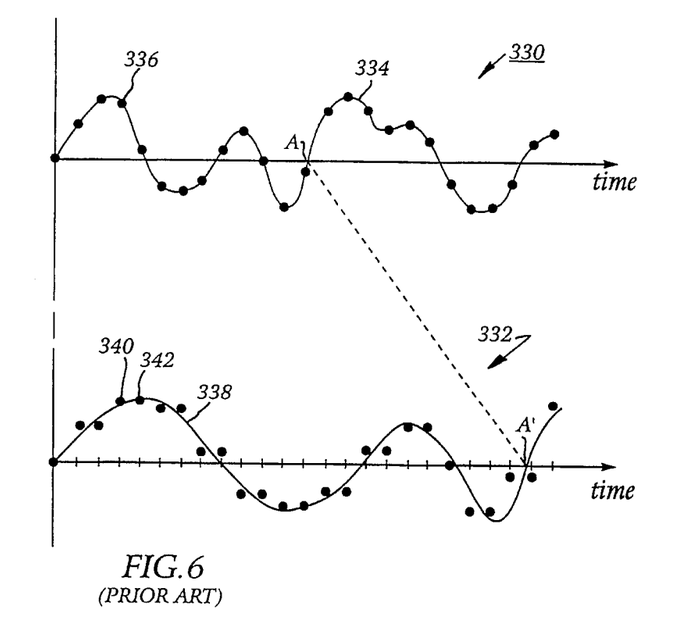
FIG. 6 is a time-domain waveform which illustrates the results of the prior art method of FIG. 5.

Continuing with FIG. 6, time-domain graphs 330 and 332 which illustrate the results of the prior art method of reducing the playback speed of stored data are shown. More particularly, the time-domain graph 330 includes a time-domain waveform 334 corresponding to a segment of digital PCM data being played back at normal speed. The digital PCM data consists of data elements 336 which taken together form a PCM-encoded version of the corresponding time-domain waveform 334. Similarly, the graph 332 shows a time-domain waveform 338 corresponding the same segment of digital PCM data being played back at one half speed.

In the prior art method of adjusting the speed, the digitized time-domain waveform 334 is effectively resampled to obtain the time-domain waveform 338. For example, to reduce the playback speed by one half, each data element 336 from the time-domain waveform 334 is replicated to form two identical samples 340, 342 of the time-domain waveform 338. This effectively "stretches" the time-domain waveform 334 in time to form the time-domain waveform 338. Accordingly, when the waveform 338 is played back, the musical notes are played back at one half speed without altering the pitch. Note that point (A) in waveform 334 corresponds to point (A') in waveform 338.

However, the prior art method of reducing the playback speed requires that the entire time-domain waveform 334 be resampled and stored prior to playback. Moreover, the amount of memory required to store the time-domain waveform 338 increases as the playback speed is decreased. In the example shown, when the playback speed is reduced by one half the amount of memory required to store the time-domain waveform 338 is doubled. Similarly, if the playback speed is reduced by one third the amount of required memory is tripled, and so on.

The prior art method of reducing the playback speed is further limited in that the resampling is not performed dynamically. Stated differently, since the entire time-domain waveform 334 must be resampled prior to playback, the playback speed cannot be adjusted while song or passage continues to be played. Thus, if the student desires to adjust the playback speed while practicing a song, the playback must be stopped, the entire waveform resampled and stored, the starting point within the waveform located, and then playback restarted.

A closer examination of time-domain waveform 338 reveals an additional problem with the prior art method. Since each data element 336 of the time-domain waveform 334 is replicated to produce identical data elements 340 and 342, the stretched time-domain waveform 338 contains significant amounts of distortion which are not present in time-domain waveform 334. the amount of distortion increases as the playback speed is further reduced and is an unavoidable result of the prior art method. This distortion is particularly noticeable when "clean" musical tones, such as those generated by an acoustic guitar, are slowed.

Figure 7:
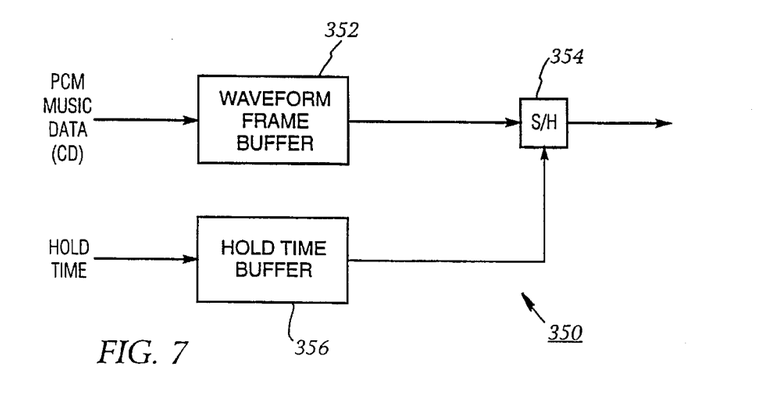
FIG. 7 is a functional block diagram which illustrates a method of reducing the playback speed used in the present invention.

FIG. 7 shows a functional block diagram of a speed conversion device 350 constructed in accordance with the present invention. The speed conversion device 350 includes a waveform frame buffer 352, a sample-and-hold circuit 354, and a hold time buffer 356. The waveform frame buffer 352 provides temporary storage for successive frames of digital PCM data which are read by the CD-ROM drive 112. The PCM data samples of each stored frame are successively transferred to the sample-and-hold circuit 354 where they are held for a time period controlled by the hold time buffer 356. The time period is inversely proportional to be desired slow down time and the result is equivalent to the resampling method of the prior art. However, the method of the present invention has the advantages of not requiring an increase in memory and of being able to change the playback speed by both integer and non-integer times. Additionally, the method of the present invention may be done dynamically during a playback.

Figure 8:
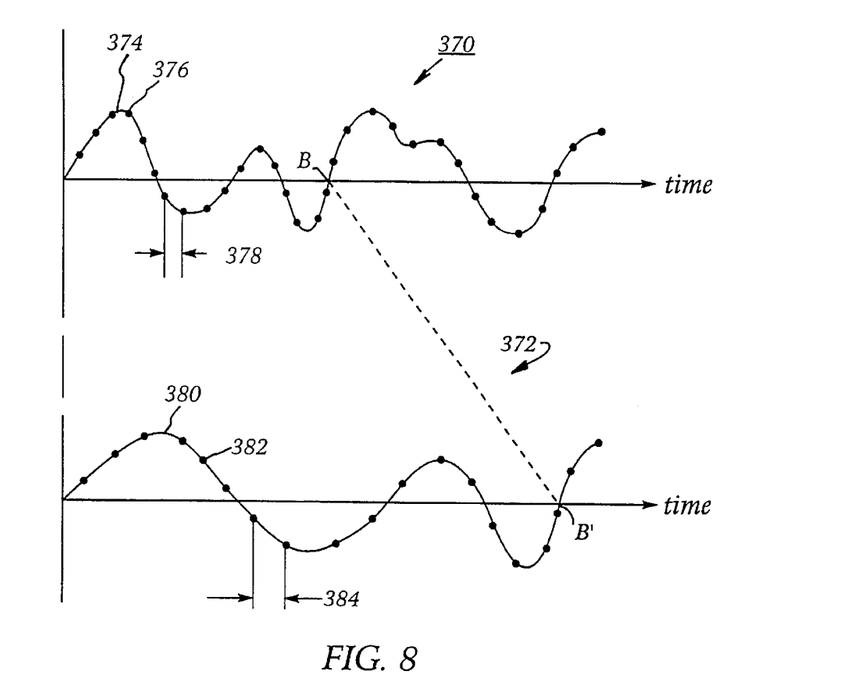
FIG. 8 is a time-domain waveform which illustrates the results of the method of FIG. 7.

Continuing with FIG. 8, time-domain graphs 370 and 372 which illustrate the results of the present method of reducing the playback speed of stored data are shown. More particularly, the time-domain graph 370 includes a time-domain waveform 374 corresponding to a segment of digital PCM data being played back at normal speed. The digital PCM data consists of data elements 376 which taken together form a PCM-encoded version of the corresponding time-domain waveform 374. Similarly, the graph 372 shows a time-domain waveform 380 corresponding the same segment of digital PCM data being played back at one half speed. Using the present method, time-domain waveform 374 is effectively resampled to obtain the time-domain waveform 380. For example, to reduce the playback speed by one half, the temporal distance 378 between each adjacent data element 376 of the time-domain waveform 374 is doubled (384) to form time-domain waveform 380. This effectively "stretches" time-domain waveform 376 in time to form time-domain waveform 380. Accordingly, when the waveform 380 is played back the musical notes are played back at one half speed without altering the pitch.

Figure 9:
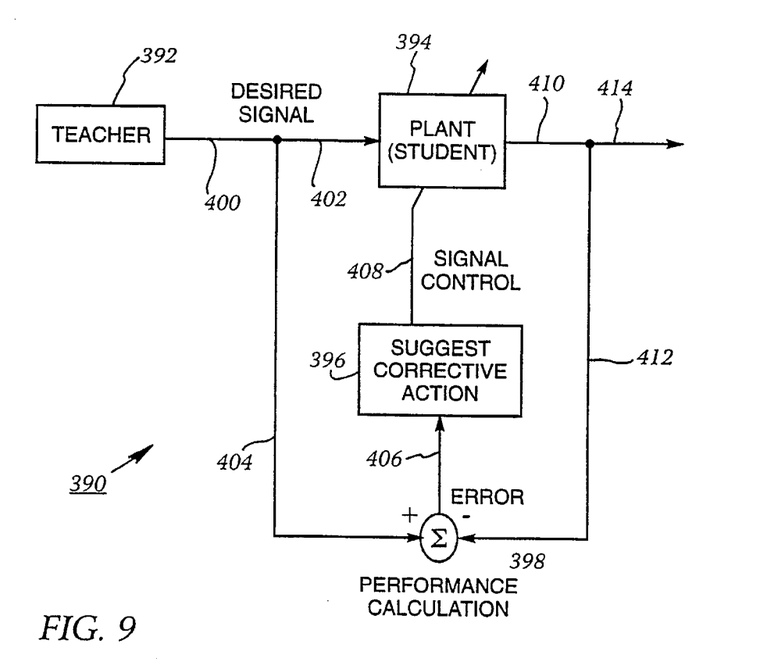
FIG. 9 is a functional block diagram of a teaching paradigm used in the present invention.

FIG. 9 is a functional block diagram of a teaching paradigm 390 used in the present invention. In the teaching paradigm 390, a teacher 392 demonstrates the correct way to play a musical passage in the form of a desired signal 400. The demonstrated signal 400 is sent to both the plant (student) 394 via signal path 402, and to a performance measurer 398 via signal path 404 (e.g. desired signal). The student 394 responds by playing the same musical passage and a corresponding signal 410 is generated. The signal 410 is split to form an output signal 414 and a feedback signal 412. The desired signal and feedback signal are compared and an error signal 406 is generated. The error signal 406 is used to generate a suggested corrective action 396, which is transmitted to the student in the form of a control signal 408.

In accordance with the present invention, FIG. 10 is a flow chart illustrating the principle steps of the instructional method of the present invention. When starting the system (block 420), the first step is to initialize the system (block 422) and, following initialization, to select whether the student wishes to select songs or drills for instruction (block 424). If the choice "songs" is selected (block 426), the student is then prompted to select a desired song (block 432) and a number a parameters which will control delivery of the instructional material contained on the CD-ROM within the CD-ROM drive 112. In particular, the student is prompted to select whether or not a hands-on feature will be displayed on the display device 104 (block 434), and the tempo for the playback (block 436). Following these selections, playback begins (block 440), whereupon the student is given both video and audio playback of the selected song to observe (block 442). Immediately following observation of the song being played back, the student is prompted to then play the song (block 444).

After playing the song, the student is asked whether or not the system should repeat the song just played (block 446). If the student answers affirmatively, the student is queried whether or not he or she would like to select a new tempo (block 438), and if so the prior steps are repeated beginning with the select tempo step shown in block 436. If not, the process is repeated beginning at the begin playback step shown at block 440.

If the student does not select the option of repeating the song played (block 446), the system will then ask the student if he or she desires to play a new song (block 448). If the student answers affirmatively, the entire process is repeated beginning with the select song block 432. If the student does not desire to play a new song, the program will terminate the particular practice session (block 470).

If the student selects the option to play drills instead of songs during the select drills step of block 428, then a similar process as described above is followed. The fist step in the process is to select a particular drill to be practiced (at block 450). After selection of the desired drill, the student is prompted to select whether or not the hands-on feature will be displayed on the display device 104 (block 452), and the tempo for the playback (block 454). Following these selections, playback begins (block 456), whereupon the student is given both video and audio playback of the selected drill to observe (block 460). Immediately following observation of the drill being played back, the student is prompted to then play the drill (block 464).

After playing the drill, the student is asked whether or not the system should repeat the drill just played (block 466). If the student answers affirmatively, the student is queried whether or not he or she would like to select a new tempo (block 458), and if so the prior steps are repeated beginning with the select tempo step shown in block 454. If not, the process is repeated beginning at the begin playback step shown at block 456.

If the student does not select the option of repeating the drill played (block 466), the system will then ask the student if he or she desires to play a new drill (block 468). If the student answers affirmatively, the entire process is repeated beginning with the select drill block 450. If the student does not desire to play a new drill, the program will terminate the practice session.

If neither songs nor drills is selected, the system queries the student whether or not he or she desires to quit (block 430). If the student does not wish to quit the system at that time, the student is given another opportunity to select songs or drills (block 424). If the student answers, however, affirmatively, then the program will end (block 470).

Figure 11:
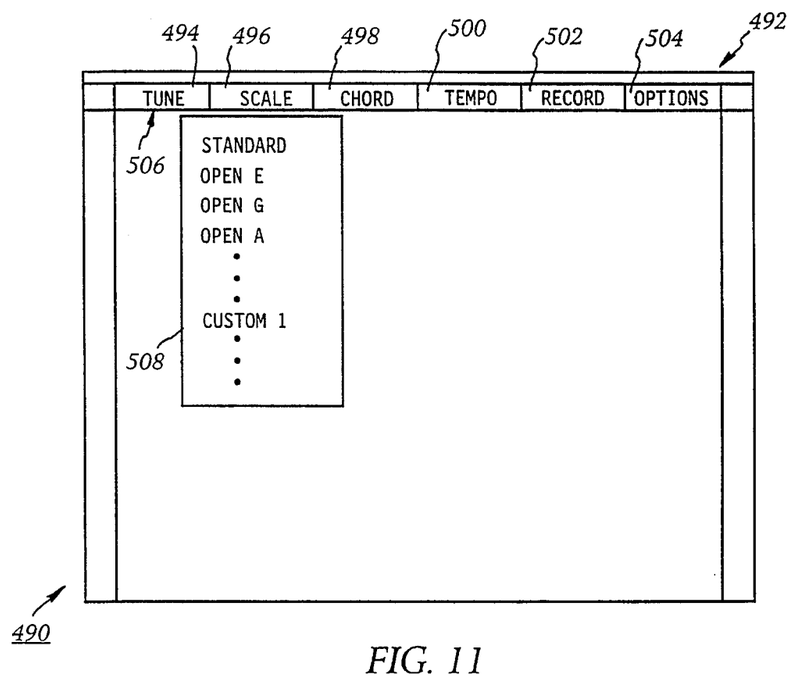
FIG. 11 illustrates a menu for selecting tuning options in the present invention.

Continuing with FIG. 11, an exemplary control screen 490 and menu for use with the present invention is shown. The screen 490 includes a cursor 506 and a menu bar 492 which may extend across the width of the screen 490. The menu bar 492 includes function selection fields such as a tuning field 494, a scale field 496, a chord field 498, a tempo field 500, a record field 502, and an options field 504. In order to select the functions of one or more of the fields, the cursor 506 is moved to that field and the control device 108 is used to select the corresponding function. For each of the fields, one or more corresponding function menus may be accessed to display additional selection fields associated with the base field. For example, the tuning field 494 may include tuning menu 508. The cursor 506 may then be moved onto the function menu to make a desired selection.

Figure 12:
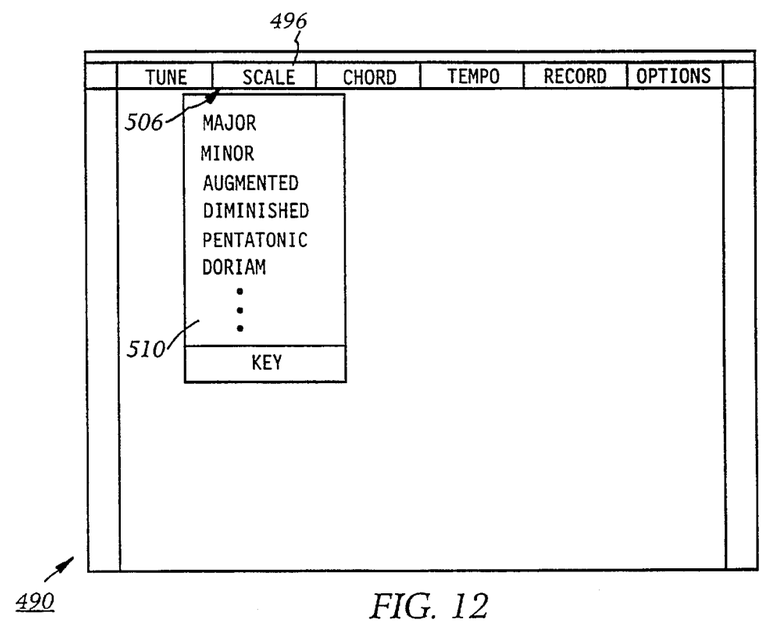
FIG. 12 illustrates a menu for selecting practice scales in the present invention.

FIG. 12 shows another exemplary function menu 510 which is a part of the scale field 496. In order to select one of the scales, the cursor 506 is moved to that scale and the scale is then selected.

Continuing with the example, the songs may be selected either to present the music and style of a particular musician, or to present the general playing techniques of a broader musical category (e.g., rock, blues, jazz). The musical passages may include standard scales, finger exercises and chord progressions, or more advanced material such as wide-interval fingering, tapping and harmonics. In either case, the overall tempo of the song or passage may be manually adjusted by the student or automatically adjusted by the system according to the student's individual playing proficiency. The musician or composer of the music can also be displayed at any time during the lesson, either to demonstrate the playing of a particular song or passage, to provide playing tips and comments, or to simply play along with the student.

Figure 13:
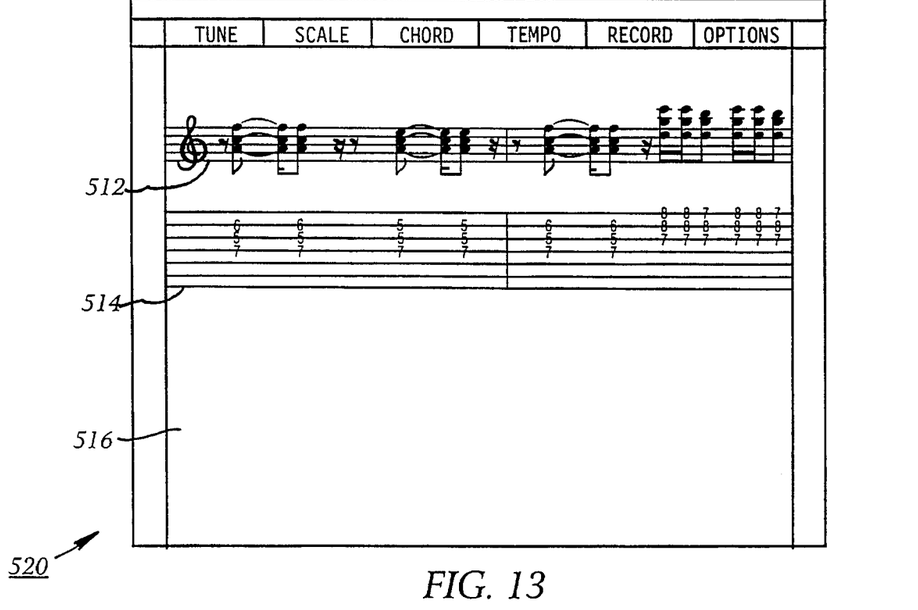
FIG. 13 illustrates a display of musical notation and guitar tablature in the present invention.

FIG. 13 illustrates an example operating display containing musical notes and tablature along with a secondary display area. More particularly, the display 520 includes a musical notation 512 containing the standard musical notation of the song being played, and a tablature 514 showing the guitar tablature for the same set of musical notes. Also included is a secondary display area 516 which is used to display various menu items, commands, playing tips, and real time video images.

Figure 14:
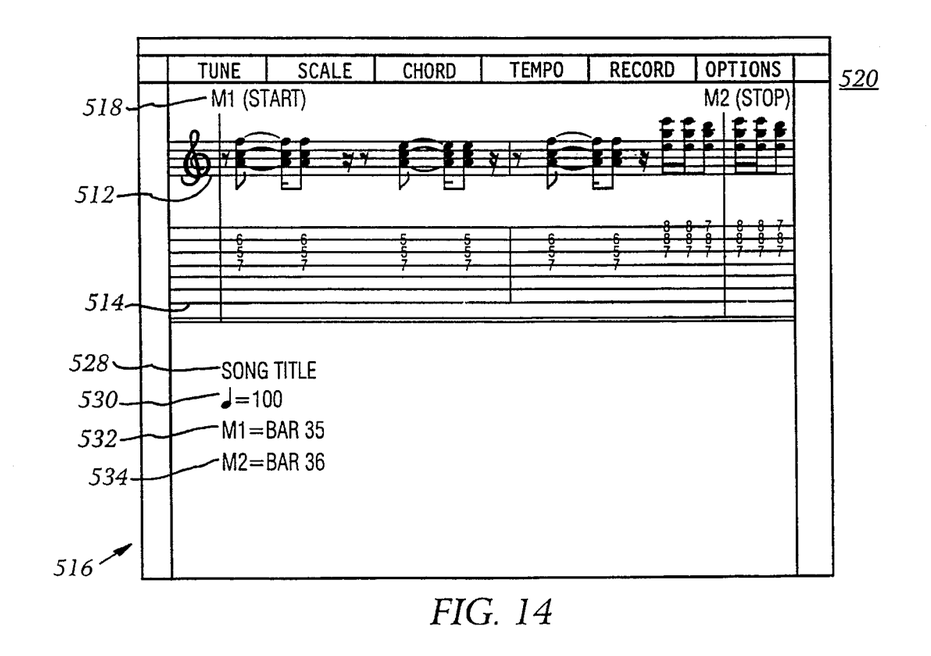
FIG. 14 illustrates start and stop markers for use with the display of FIG. 13.

FIG. 14 illustrates the use of a start marker 518 and a stop marker 520. The marker 518 is used to indicate the starting point of a song or passage to be practiced, while the marker 520 is used to indicate the stop portion. At at any point in time only one or none of the markers may be on the display. When the student begins practicing, the music will start at the exact location indicated by the start marker 518 and will continue until it reaches the stop marker 520. The student may practice along as the music is being played and when the stop marker is reached may start the play again at the same point as before. Also shown in FIG. 14 are examples of information which may be displayed in secondary screen 516. Included, for example, are a song title 528, a quarter note value 530, and the exact locations 532 and 534 within the song being played of the start marker 518 and the stop marker 520.

Figure 15:
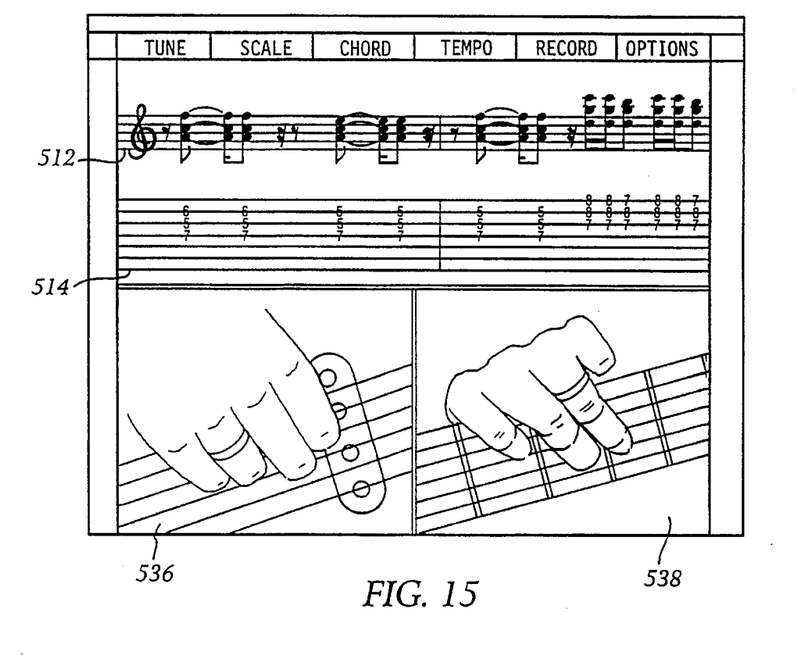
FIG. 15 illustrates the "hands-on" mode of the present invention, which includes video windows for clarifying how the music of FIG. 13 is played.

FIG. 15 shows the use of full motion video displays 536 and 538 to provide additional details for playing the song indicated by 512. As shown in FIG. 15, both the left and right hand positions and the motion can be shown using the video displays, where the motion will be at the same speed as the tempo selected by the student. This display allows the student to see exactly the finger positions in picking and strumming use to play the particular passage. The full motion video displays 536 and 538 illustrated, are selected during the step of selecting hands-on/off, in blocks 434 and 452 of FIG. 10.

Figure 16:
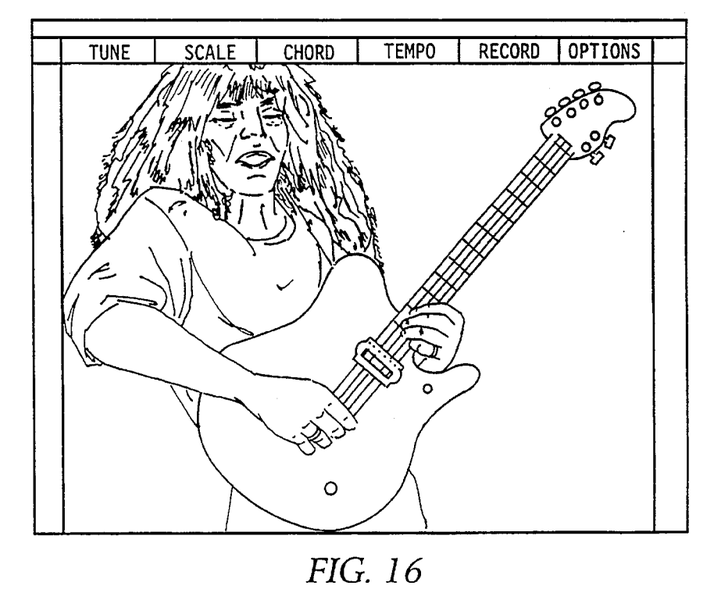
FIG. 16 illustrates an example of a full screen display for use with the present invention.

FIG. 16 illustrates the full screen motion video possible utilizing the music instruction system 100 of the present invention.

From the foregoing it is to be appreciated that the present invention provides a novel process for learning to play a musical instrument utilizing a computer. The process includes the steps of providing instructional material in a storage medium capable of being quickly accessed by the computer 102, utilizing the computer 102 to select instructional material to be presented, retrieving and playing back the selected instructional material from the storage medium, controlling delivery of the instructional material, and combining musical output of a practice instrument with musical output generated by the computer corresponding to the selected instructional material. CD-ROM products utilized in connection with the present invention may be divided into two major categories: music instruction and music-oriented games. Both types of products use aspects of education and entertainment to make learning the particular musical instrument interesting and entertaining. The music instruction compact disks will each feature interactive video instruction by a world class musician, and include both the music and the tablature to the selected songs. The music-oriented games are preferably adventure-type games in which the user progresses through a number of levels by playing an instrument such as a guitar. The music instruction system 100 permits the student to select between songs to be played or drills to be practiced, and further permits the student to determine important parameters under which the instruction will be delivered, including the tempo of the music as well as whether or not particular video displays will be provided, such as the hands-on feature.

Although a particular embodiment of the invention has been described in detail for purposes of illustration, various modifications may be made without departing from the spirit and scope of the invention. Accordingly, the invention is not to be limited, except as by the appended claims.

I claim:

1. A process for learning to play a musical instrument utilizing a computer, comprising the steps of:

providing instructional material in a storage medium capable of being quickly accessed by the computer;

utilizing the computer to select instructional material to be presented;

retrieving and playing back the selected instructional material from the storage medium;

controlling delivery of the instructional material; and combining musical output of a practice instrument with musical output generated by the computer corresponding to the selected instructional material.

2. The process of claim 1, wherein the step of providing instructional material on a selected storage medium, comprises the step of providing both audio and video instructional materials on a CD-ROM storage medium.

3. The process of claim 2, wherein the step of utilizing the computer to select particular instructional material to be presented, comprises the step of selecting a particular musical piece to be played back during the step of retrieving and playing back the selected instructional material from the storage medium.

4. The method of claim 3, wherein the step of retrieving and playing back the selected instructional material from the storage medium, includes the step of displaying the notation or tablature of the musical piece.

5. The method of claim 4, including the step of highlighting a particular note or chord of the notation or tablature during the step of retrieving and playing back the selected instructional material from the storage medium.

6. The method of claim 5, including the step of highlighting the note or chord for the relative duration of the note or chord.

7. The method of claim 4, wherein the step of combining musical output of a practice instrument with musical output generated by the computer corresponding to the selected instructional material, includes the step of selecting whether or not a video display of the manner of playing the musical instrument will be shown with the displayed notation or tablature.

8. The method of claim 7, wherein the step of controlling delivery of the instructional material, includes the step of controlling the tempo of the musical output generated by the computer without affecting the pitch thereof.

9. The method of claim 8, including the step of utilizing a sample and hold circuit which receives input from a waveform frame buffer and a hold time buffer, to control the tempo.

10. The method of claim 3, wherein the step of retrieving and playing back the selected instructional material from the storage medium, includes the step of displaying an expert musician playing the selected musical piece in a video display concurrently with audio output of the musical piece by the computer.

11. The process of claim 1, wherein the step of utilizing the computer to select particular instructional material to be presented, comprises the step of selecting from a song to be played or a drill to be practiced.

12. The method of claim 1, wherein the step of combining musical output of a practice instrument with musical output generated by the computer corresponding to the selected instructional material, includes the step of mixing musical output of the practice instrument with musical output of the computer.

13. The method of claim 12, including the step of providing background music through the computer, and controlling the mix of background music relative to foreground music.

14. The method of claim 13, including the step of controlling the mixture of musical output of the practice instrument relative to musical output of the computer.

15. The method of claim 12, including the steps of:

comparing the musical output of the practice instrument to the musical output generated by the computer;

generating an error signal;

computer-analyzing the error signal; and generating suggestions for minimizing differences in the musical output of the practice instrument and the computer.

16. A musical instrument instruction system, comprising:

a CD-ROM for storing audio and video musical instrument instructional materials;

a computer including a graphics display, for retrieving and playing back the instructional materials stored on the CD-ROM;

means connected to said computer for receiving an input signal from a practice instrument;

means for selecting a segment of the instructional materials stored on the CD-ROM;

means for playing back the selected instructional materials, including both the audio and video components thereof; and means for controlling playback of a musical selection within the selected instructional materials.

17. A musical instrument instruction system as set forth in claim 16, wherein the instructional material playing means includes means for displaying the notation or tablature for the musical selection.

18. A musical instrument instruction system as set forth in claim 17, including means for highlighting a particular note or chord of the notation or tablature for the relative during of the note or chord.

19. A musical instrument instruction system as set forth in claim 17, including means for displaying an expert musician playing the musical selection in a video display concurrently with audio output of the musical selection by the computer.

20. A musical instrument instruction system as set forth in claim 16, including means for creating a video image display of the manner of playing the musical instrument, together with a video display of the notation or tablature for the musical selection.

21. A musical instrument instruction system as set forth in claim 16, wherein the playback controlling means includes means for controlling the tempo of the musical selection without affecting the pitch thereof.

22. A musical instrument instruction system as set forth in claim 21, wherein the tempo controlling means includes a sample and hold circuit which receives input from a waveform frame buffer and a hold time buffer.

23. A musical instrument instruction system as set forth in claim 16, including a mixer for combining musical output of the practice instrument with musical output generated by the computer corresponding to the musical selection.

24. A process for learning to play a musical instrument utilizing a computer, comprising the steps of:

providing both audio and video instructional materials on a CD-ROM storage medium;

utilizing the computer to select instructional materials to be presented from those stored on the CD-ROM storage medium;

receiving an input signal from a musical instrument and providing a digital representation of the input signal to the computer to allow monitoring of the musical instrument by the computer;

selecting delivery parameters for desired playback of the selected instructional material, including the steps of selecting whether or not to display an expert musician playing a selected musical piece in a video display concurrently with audio output of the musical piece by the computer, and controlling the tempo of the musical output generated by the computer without affecting the pitch thereof; and playing back the selected musical piece in accordance with the selected delivery parameters.

25. The process of claim 24, wherein the playing back step includes the step of displaying the notation or tablature of the musical piece.

26. The process of claim 25, including the step of highlighting a particular note or chord of the notation or tablature for the relative duration of the note or chord.

27. The process of claim 25, including the step of selecting whether or not a video display of the manner of playing the musical instrument will be shown with the displayed notation or tablature.

28. The process of claim 24, including the step of combining musical output of the practice instrument with musical output generated by the computer corresponding to the selected instructional material.

29. The process of claim 28, wherein the combining step includes the steps of mixing musical output of the practice instrument with musical output of the computer, comparing the musical output of the practice instrument to the musical output generated by the computer, generating an error signal, computer-analyzing the error signal, and generating suggestions for minimizing differences in the musical output of the practice instrument and the computer.

30. The process of claim 24, wherein the computer utilizing step comprises the step of selecting from a song to be played or a drill to be practiced.

31. A musical instrument instruction system, comprising:

means for receiving a line-level input signal from a musical instrument or microphone;

an analog-to-digital converter coupled to said receiving means and providing as an output digitized signals;

a CD-ROM for storing audio and video musical instrument instructional materials;

a computer including a graphics display, for retrieving and playing back the instructional materials stored on the CD-ROM, said computer receiving said digitized signals;

means for selecting a segment of the instructional materials stored on the CD-ROM;

means for playing back the selected instructional materials, including both the audio and video components thereof; and means for controlling playback of a musical selection within the selected instructional materials.

32. The musical instrument instruction system of claim 31, further comprising:

a signal splitter connected between said receiving means and said analog-to-digital converter, said signal splitter having a first output and a second output, said analog-to-digital converter connected to said first output;

a musical effects device connected to said second output;

a digital-to-analog converter for converting digital output signals from said computer into a computer-generated analog audial signal; and a mixer connected to said musical effects device and said digital-to-analog converter, said mixer having an output adapted for connection to an external amplifier.

* * * * *